United States Patent [19]

Helmling et al.

[11] Patent Number: 4,965,086
[45] Date of Patent: Oct. 23, 1990

[54] CHEMICAL-MECHANICAL TREATMENT OF LIGNOCELLULOSICS TO IMPROVE NUTRITIVE VALUE

[75] Inventors: Oswald Helmling, Wyckoff; G. Arnold, Ringwood, N.J.; H. Rzehak, Ryebrook, N.Y.; George C. Fahey, Jr., Urbana, Ill.; Larry L. Berger, Champaign, Ill.; Neal R. Merchen, Champaign, Ill.; John Medina, Nutley; Rudi Moerck, Montville, both of N.J.

[73] Assignee: Degussa Aktiengesellschaft, Frankfurt am Main, Fed. Rep. of Germany

[21] Appl. No.: 140,690

[22] Filed: Jan. 4, 1988

[51] Int. Cl.$^5$ ................................. A23K 1/00
[52] U.S. Cl. ................................. 426/636; 426/615; 426/626; 426/658; 426/807; 426/516
[58] Field of Search ............... 426/635, 636, 626, 807, 426/658, 615, 516, 519; 162/224, 78

[56] References Cited

U.S. PATENT DOCUMENTS

| 3,988,483 | 10/1976 | Deyoe et al. | 426/636 |
| 4,176,203 | 11/1979 | Lagerstrom | 426/636 |
| 4,316,747 | 2/1982 | Rugg et al. | 127/37 |
| 4,316,748 | 2/1982 | Rugg et al. | 127/37 |
| 4,376,129 | 3/1983 | Piukovich et al. | 426/635 |
| 4,390,375 | 6/1983 | Rugg et al. | 127/37 |
| 4,400,218 | 8/1983 | Koch et al. | 127/37 |
| 4,462,864 | 7/1984 | Carles et al. | 162/78 X |
| 4,478,644 | 10/1984 | Berger et al. | 127/37 |
| 4,591,386 | 5/1986 | Rugg et al. | 127/37 |
| 4,649,113 | 3/1987 | Gould . | |
| 4,806,475 | 2/1989 | Gould | 162/78 X |
| 4,842,877 | 6/1989 | Tyson | 426/271 |

FOREIGN PATENT DOCUMENTS 1141376  2/1983  Canada .................................. 162/21

OTHER PUBLICATIONS

Mamers et al., "Explosion Pulping of Bagasse and Wheat Straw" Tappi, Jul. 1981, vol. 64, No. 7, pp. 93-96.

Primary Examiner—R. B. Penland
Attorney, Agent, or Firm—Beveridge, DeGrandi & Weilacher

[57] ABSTRACT

A method is disclosed for treating a lignocellulosic substrate in order to imrpove its nutritive value wherein a plant substrate is treated with a sufficient amount of an alkaline material and hydrogen peroxide, or a compound capable of generating hydrogen peroxide, for a sufficient period of time and the reaction mass is extruded to produce a product having increased nutrient availability.

7 Claims, No Drawings

CHEMICAL-MECHANICAL TREATMENT OF LIGNOCELLULOSICS TO IMPROVE NUTRITIVE VALUE

Efforts have been made in recent years to improve the nutritive value of roughages consumed by cattle and other ruminants. A large percentage, which may range to up to 85%, of the feed consumed by cattle and other ruminants during the course of their lifetime is composed of forages and roughages. A major underutilized resource is the roughage and by-product feedstuffs high in structural carbohydrate content. Cereal grain residues are the principal farm by-products in the United States. Such materials as wheat straw, soybean residues and cornstalks account for more than 80% of the many millions of tons of total farm residue supply produced in the United States.

Erosion-resistant grasses and other plants are important in the United States in order to improve the quantity and quality of water supplies. Much water in the United States is now contaminated because of pollution caused by soil erosion. A large percentage of the rivers and lakes in the United States suffer from pollution caused by the soil which is washed into those water sheds. Land that is used for grain production is particularly susceptible to soil erosion and, therefore, it would be a significant advance if more land could be devoted to the growing of erosion-resistant grasses or other plants which would also be suitable for a cash crop for the farmer. If there could be developed a way to utilize such erosion-resistant grasses and plants to provide feed for ruminants, this would represent an incentive for the farmer to devote his land to the growing of such environmentally protective plants. A problem with the erosion-resistant grasses and other plants is that the lignocellulosics which comprise these plants are fairly low in nutrient availability unless some form of processing is used in order to improve the nutritive value of such lignocellulosics for livestock. Such processing should bring about an increase in the nutrient availability which is translated into increased digestibility and roughage acceptability (feed intake) to the animal. A renewed appreciation of the value of otherwise poor quality roughages and by-products has been noted because of the introduction of a number of different methods which include mechanical, chemical and microbiological methods for improving the nutritional value thereof. Many prior methods utilized to process such lignocellulosics have not proven to be all together satisfactory because of a variety of problems including the fact that the cost of such methods usually exceeds the value of the end-product feed for livestock.

It has long been recognized that the problem concerning digestion of plant polysaccharides resides in the association among cell wall components, primarily the association between lignin and hemicelluloses. Alkaline treatments of such plant materials have been used to disrupt the cell wall. It is believed that these materials function to dissolve some hemicelluloses and lignin.

It is also known that hydrogen peroxide assists in cell wall degradation.

Thus, it is recognized that in order to improve the nutritive value of lignocellulosics for livestock feeding purposes, some form of treatment or processing of the plant materials is required. A number of treatments such as alkaline cooking, steam explosion and many combined mechanical and chemical processing steps have been developed.

In Gould, U.S. Patent 4,649,113, there is disclosed a treatment of wheat straw with 25-50% hydrogen peroxide with a pH of 11.2 to 11.8 to delignify non-woody lignocellulosic substrates in order to form useful carbohydrate food materials for livestock. However problems in the prior art are many including, for example, the fact that long reaction times at low stock and high chemical concentrations are typical which means large reaction vessels, low production rates and high investment and chemical costs.

In typical prior art methods, alkaline hydrogen peroxide is used for the treatment of lignocellulose by preparing a suspension of the cellulosic material at a relatively low dilution ratio of, for example, 4% by weight per volume together with hydrogen peroxide in the amount of 1% by weight per volume (i.e. 25% hydrogen peroxide based on wheat straw) and sodium hydroxide in the amount of approximately 0.68% (i.e. 17% caustic based on wheat straw) to bring the solution to a pH of 11.5 and then reacting overnight (a long reaction time) at ambient temperature with stirring or agitation. The slurry mass is typically filtered and washed to remove the solubilized components. Results obtained in the prior art are typically a solubilization of up to about 60% of the plant lignin and a reduction in the ordered structure of cellulose and a greater than 90% conversion of cellulose to glucose.

Alkaline hydrogen peroxide treatment of wheat straw, cornstalks and corncobs nearly doubled the rate and extent of digestion of these materials in the rumen of cattle. It has also been observed in livestock experiments that the alkaline hydrogen peroxide-treated wheat straw resulted in the feed being more digestible than for the same livestock fed with untreated wheat straw. Thus, it is clear that the alkaline hydrogen peroxide treatment of cellulosic plant materials results in a considerable improvement in the digestibility of these plant materials.

The finding that the alkaline hydrogen peroxide treatment renders plant fiber more digestible by ruminants establishes that the use of crop residues and other cellulosic plant biomass which would normally be discarded can now be enhanced for use in animal production systems. Efficient utilization of these materials can provide additional income for farmers and allow marginal erosion-prone crop land to be utilized in a more environmentally responsible manner.

Most research on the processing of plant byproducts or crop waste is designed to improve the nutritive value of such materials for ruminants. Ruminant animals have a very highly efficient digestive system capable of maximizing fiber utilization but, in spite of that, are unable to extract sufficient energy to grow and (or) produce milk at economically acceptable levels when fed lower quality, highly lignified by-products. Animal producers are faced with the problem of economics of processing fibrous and by-product feeds available in their areas to produce satisfactory feed supplies for their livestock. In many parts of the world, fibrous and byproduct feeds are the major or perhaps the only significant feedstuff available and, therefore, the goal of the feeding program must be to maximize microbial digestion and utilization of all of the ingested material.

It is well established that hydrolytic agents, such as alkaline compounds, partially overcome the problems with regard to digestibility and even enhance the extent that structural polysaccharides can be degraded. These compounds function to disrupt the cell wall by dissolving a portion of the hemicelluloses and lignin.

SUMMARY OF THE INVENTION

It has now been discovered that by combining certain mechanical and chemical forces, it is possible to significantly improve the nutritive value of high fiber roughages. It has been determined that the cell wall components protecting the structural polysaccharides from attack by the ruminal microbes can be substantially modified by a combination of mechanical and chemical forces and specifically operating within a selected alkaline hydrogen peroxide ratio and concentration range and combined with specific mechanical forces, namely, extrusion, with strong grinding forces. The increase in temperature resulting from the conversion of mechanical to thermal energy in the extrusion process accelerates the decomposition of the lignins and carbohydrate-lignin linkages.

It is preferred to operate under conditions wherein the ratio of sodium hydroxide to hydrogen peroxide is determined by the formula:

$$\% \; NaOH = 3\% + F \times \% H_2O_2$$

wherein:

% chemicals is based on the oven dry lignocellulose, and

F is a number greater than 0.85, preferably 1.2. The upper limit of F is determined by the sodium content allowed in the diet (due to compatability of the food for the ruminant).

NaOH car be partly substituted for by other strong alkaline sources such as potassium hydroxide and the like.

It has been surprisingly found that the improvement in digestibility cannot be obtained by using extrusion alone or by using the alkaline hydrogen peroxide treatment alone. Thus, if the roughages are extruded with the usual alkaline hydroxide peroxide solutions, the improvement in digestibility is only mediocre.

The discovery of the synergistic effect in an extruding apparatus under the reaction conditions set forth herein enables an extremely efficient operation using all types of lignocellulosic source materials. For example, wheat straw, oat straw, rice straw, barley straw, rye straw, buckwheat straw, flax straw, cornstalks, corncobs, cornhusks, all types of grasses and other related plants may be utilized for purposes of this invention.

It is not necessary in accordance with the present invention to dewater the source of the plant material prior to the treatment. Only a small amount of the hydrogen peroxide and sodium hydroxide or other alkali are necessary. Thus, by treating lignocellulosics with only 1-2% $H_2O_2$ and 4-5% NaOH, based on an oven-dry material, it will now be possible to increase the amount of cellulose available for enzymatic digestion from 30 to 40% (untreated material) to a maximum of 80%. In general, 80% is very close to the maximum achievable digestibility for roughages because only the hemicelluloses and cellulose fractions of the lignocellulosics are accessible for an enzymatic saccharification.

DETAILED DESCRIPTION OF THE INVENTION

In carrying out the invention, a plant material containing lignocellulosics in a field-harvested state is first chopped or ground to a convenient size. The size of the particles is not narrowly critical, but it has been found that a size of one-half to one and a half inches or 1.5 to 2.5 cm is a convenient size (for achieving a constant wheat straw flow in the extruder) and one that is readily attainable using conventional chopping, grinding or other comminuting apparatus known in the art. This crop material is impregnated with the caustic and hydrogen peroxide. Any suitable means can be used for blending the crop with the caustic and hydrogen peroxide. The blended materials are then conveyed to a conventional extruder, such as a twin screw, and treated in the extruder for a short period of time (depending on the extruder design, in the seconds to minute range). Depending on the design of the extruding apparatus, the impregnation of the lignocellulosic plant material with the alkaline solution can also be performed in the extruder. That is, the extruder can be built so as to accommodate the charge of chopped or comminuted plant material and the alkaline material. After a certain reaction time, hydrogen peroxide is injected into the extruder. Adding caustic prior to hydrogen peroxide will have beneficial effects due to lowering hydrogen peroxide decomposition caused by contaminants and heavy metal ions. The caustic/hydrogen peroxide ratio is adjusted to the equation:

$$\% \; NaOH = 3\% + F \times \% \; H_2O_2$$

wherein F is a number greater than 0.85.

If it is not convenient to add the alkaline material first, then this material can be also impregnated with an alkaline hydrogen peroxide solution before or during extrusion. In that event, the digestibility improvement may be somewhat lower.

The present invention provides for a synergistic effect of chemical-mechanical forces under optimized caustic-hydrogen peroxide ratios as set forth by the above equation. In this regard, it is to be noted that the term "extrusion" as used herein means subjecting to high mechanical shearing and grinding forces. These forces are totally different from forces encountered in mechanical mixing processes. Suitable high mechanical shearing extrusion apparatus is known in the art. Preferably, the extrusion is performed at high consistencies above 50% solids content for best results. Most preferred is to have as dry a process as possible.

The following methods were used to evaluate the product.

CELLULASE TEST:

2 g of dried sample (dried at 60° C. for 12 hours) were incubated with 300 mg cellulase and 40 ml buffer solution containing 50 mM citric acid, 0.05% thymol and 0.1 M $Na_2HPO_4$. The pH of samples with extremely high sodium hydroxide content was adjusted to 4.5 with additional citric acid prior to incubation. After a reaction time of 24 hours at 45° C. in an incubator, the insoluble residue was recovered by filtration and was then washed and dried at 105° C. Solubilization was calculated in two ways:

$$\text{Total solubilization (\%)} = 100 - 100 \times \frac{A}{B} = 100 \times \frac{B - A}{B} \quad 1.$$

wherein A = g of dried residue and B is equal to 2 g $-[g(NaOH + Na_2SiO_4)]$.

$$\text{Corrected solubilization (\%)} = 100 \times \frac{C - A}{B} \text{ wherein} \quad 2.$$

A and B equals the above-mentioned notation and C is the grams of dried residue of a blank (2 g dried wheat straw treated with buffer solution only, no cellulase). This indicates the amount of material dissolved by the buffer solution alone. The "corrected solubilization" is a measurement of the actual digestion by the cellulase enzyme of *Trichoderma reesei*.

IN VITRO DRY MATTER DISAPPEARANCE:

This work was conducted according to the method of Tilley and Terry, J. Brit. Grassl. Soc. 18:104. Approximately 0.5 g of material is weighed into 50 ml plastic centrifuge tubes. For the fermentation stage, ruminal fluid is collected from a fistulated steer fed an alfalfa-based diet. The ruminal fluid is strained through eight layers of cheesecloth and diluted 1:1(v/v) with a mineral buffer. Incubations are conducted in triplicate using appropriate blanks. Incubation time for the fermentation stage is 48 hours. After this is completed, another 48 hours incubation of the residue with pepsin:HCl is conducted. Dry matter disappearance is then calculated.

IN SITU DRY MATTER DISAPPEARANCE:

This work was conducted according to the methods of Mehrez and Orskov, J. Agric. Sci. 88:645.

Approximately 3 g of treated material is placed in 8×14 cm dacron bags with 20-70 um pore size. Bags are placed in the rumen of a fistulated steer fed primarily alfalfa hay and incubated for 48 hours. Bags are removed from the rumen, washed with tap water until the liquid is colorless and dried at 105° C. for 8 hours. In situ dry matter disappearance is then calculated. Three replications per treatment were conducted.

It should be understood that the invention is not restricted to the manufacture of products with 40% consistency; that is, 60% moisture. With conventional extruders, mixing of chemicals will not be a problem. Therefore, products with consistencies from 20 to 80% (moisture contents of 80-20%) can be manufactured.

Increasing the alkalinity from 2 to 10% increases the digestibility (IVDMD) by approximately 36%. Above 10% sodium hydroxide, no improvement in IVDMD was noted.

Hydrogen peroxide improved digestibility only when it was activated by additional sodium hydroxide. The lowest concentration of sodium hydroxide which should be applied is about 3%. For every 1% increase in hydrogen peroxide, sodium hydroxide level must be also increased, preferably by 0.5-1.2%. Therefore, when 2, 5 or 10% hydrogen peroxide is used and F=0.85, the sodium hydroxide level that must be applied is 3+1.7, 3+4.25 or 3+8.5% respectively. With this input of sodium hydroxide, the pH dropped from approximately 12.4 to 11.0 during processing.

Results indicate that reaction pH must be maintained between 11.2 and 11.8. The factor, 0.85, may have to be increased to the equimolar sodium hydroxide/hydrogen peroxide factor of 1.18. With a factor greater than 1.2, the digestibility still improves slightly. Therefore, the upper limit of F will be determined by the compatability of the product to the animal (limited amounts of sodium ions). In the one step extruder process, the dissolving of the hemicelluloses is not a problem as there is no filtration step involved.

By adding 3% sodium silicate, the hydrogen peroxide effect may be enhanced by 3 percentage units, provided the concentration of alkali is optimized. See treatments 8 v. 13 in Table 1.

The key results of the experiments are summarized in Tables 2 and 3. Grinding energy has a major impact on in situ disappearance values. The high in situ DMD figure for treatment 2 shown in Table 3 resulted in fines washing out of the dacron bag, giving an abnormally high value as evidenced by IVDMD data.

Results indicate that with greater input of hydrogen peroxide, extent of disappearance increases. This increase with higher amounts of hydrogen peroxide is considerable when alkali is added according to the formula set forth above. In contrast, maximal digestibility can be reached with 2% hydrogen peroxide when the following formula is used:

$$\% \, NaOH = 3\% + 1.2 \times \% H_2O_2$$

as shown in treatments 7 through 10 in Table 3.

Although the use of hydrogen peroxide is preferred, any suitable compound capable of generating hydrogen peroxide in situ would be acceptable for purposes of the invention.

The product produced by the method will be suitable for feeding monogastric, as well as ruminant animals.

Further variations and modifications of the invention will be apparent to those skilled in the art from the foregoing and are intended to be encompassed by the claims appended hereto.

TABLE 1

| Treatment # | Treatment designation | % NaOH | % H$_2$O$_2$ | % Na silicate | Residual H$_2$O$_2$, ppm | Temp. °C. | pH Before | pH After | Cellulase dig. % Total | Cellulase dig. % Corr. | 48 h IVDMD, % |
|---|---|---|---|---|---|---|---|---|---|---|---|
| 1 | — | — | — | — | — | 40 | — | — | 28 | 18.5 | 38.8 |
| 2 | Washed | — | — | — | — | 55 | — | — | 25 | 17 | 36.1 |
| 3 | Washed | 2 | — | — | — | 67 | — | — | 23 | 19 | 40.8 |
| 4 | Washed | 3 | — | — | — | 71 | — | — | 28 | 21 | 43.5 |
| 5 | Washed | 5 | — | — | — | 73 | — | — | 40 | 29 | 50.9 |
| 6 | Washed | 10 | — | — | — | 66 | — | — | 45 | 26 | 58.0 |
| 7 | Washed | 20 | — | — | — | 57 | — | — | 48 | 28 | 38.5 |
| 8 | Washed | 3 | 2 | — | — | 60 | 12.4 | 10.7 | 37 | 26 | 49.5 |
| 9 | Washed | 3 | 5 | — | 1.5 | 62 | 11.7 | 10.2 | 22 | 17 | 48.3 |
| 10 | Washed | 3 | 10 | — | 1.5 | 72 | 11.1 | 10.2 | 33 | 22 | 50.0 |
| 11 | Washed | 3 | 25 | — | 80 | 45 | 10.1 | 9.6 | 40 | 24 | 56.7 |
| 13 | — | 3 | 2 | 3 | — | 76 | 12.1 | 10.1 | 35 | 24 | 52.9 |
| 14 | — | 3 | 3 | 3 | — | 70 | 12.1 | 10.7 | 36 | 22 | 52.6 |
| 15 | — | 3 | 10 | 3 | 3 | 70 | 11.1 | 10.2 | 36 | 27 | 58.7 |
| 16 | — | 4.7 | 3 | 3 | — | 76 | 12.6 | 10.9 | 39 | 23 | 60.7 |
| 17 | — | 7.25 | 3 | 3 | — | 72 | 12.6 | 11.1 | 50 | 31 | 70.3 |
| 18 | — | 11.5 | 3 | 3 | 30 | 54 | 12.4 | 10.9 | 64 | 36 | 76.8 |

TABLE 1-continued

| Treatment # | Treatment designation | % NaOH | % H$_2$O$_2$ | % Na silicate | Residual H$_2$O$_2$, ppm | Temp. °C. | pH Before | pH After | Cellulase dig. % Total | Cellulase dig. % Corr. | 48 h IVDMD, % |
|---|---|---|---|---|---|---|---|---|---|---|---|
| 19 | — | 3 | — | — | — | 60 | 12.1 | 11.0 | 39 | 21 | 55.4 |
| 20 | — | 3 | — | — | — | 68 | 11.4 | 10.3 | 36 | 22 | 52.9 |
| 21 | — | 3 | — | — | — | 74 | 11.1 | 10.2 | 37 | 16 | 51.9 |
| 22 | — | 3 | — | — | 30 | 80 | 10.7 | 9.9 | 40 | 23 | 54.9 |

TABLE 2

| Treatment # | Treatment designation | % NaOH | % H$_2$O$_2$ | % Na silicate | Grinding energy, hWh/t | 48 h IVDMD, % |
|---|---|---|---|---|---|---|
| 1 | Chopped wheat straw | — | — | — | — | 24.2 |
| 2 | Extruded wheat straw | — | — | — | 8.5 | 38.8 |
| 3 | Extruded wheat straw | 3 | 2 | — | 5.3 | 55.4 |
| 4 | Extruded wheat straw | 3 | 5 | — | 5.3 | 52.9 |
| 5 | Extruded wheat straw | 3 | 10 | — | 5.3 | 51.9 |
| 6 | Extruded wheat straw | 3 | 25 | — | 5.4 | 54.9 |
| 7 | Extruded wheat straw | 3 | 2 | 3 | 5.4 | 52.9 |
| 8 | Extruded wheat straw | 3 | 3 | 3 | 5.3 | 52.6 |
| 9 | Extruded wheat straw | 3 | 10 | 3 | 5.3 | 58.7 |
| 10 | Extruded wheat straw | 3 + 1.7* | 2 | 3 | 3.8 | 60.7 |
| 11 | Extruded wheat straw | 3 + 4.25* | 5 | 3 | 2.7 | 70.3 |
| 12 | Extruded wheat straw | 3 + 8.5* | 10 | 3 | 2.0 | 76.8 |

*% NaOH = 3% + .85 × % H$_2$O$_2$.

TABLE 3

| Treatment # | Treatment designation | % NaOH | % H$_2$O$_2$ | Grinding energy, hWh/t | 48 h in situ DMD, % | 48 h IVDMD, % |
|---|---|---|---|---|---|---|
| 1 | Chopped wheat straw | — | — | — | 36.8 | 8.2 |
| 2 | Extruded wheat straw | — | — | 6.4 | 68.5 | 18.3 |
| 3 | Extruded wheat straw | 3.9 | 1 | 5.1 | 75.2 | 39.4 |
| 4 | Extruded wheat straw | 4.7 | 2 | 4.2 | 70.3 | 46.8 |
| 5 | Extruded wheat straw | 5.6 | 3 | 5.6 | 70.2 | 53.9 |
| 6 | Extruded wheat straw | 7.3 | 5 | 7.3 | 75.6 | 68.4 |
| 7 | Extruded wheat straw | 4.2 | 1 | 3.5 | 74.0 | 56.9 |
| 8 | Extruded wheat straw | 5.4 | 2 | 3.2 | 80.2 | 58.5 |
| 9 | Extruded wheat straw | 6.5 | 3 | 3.3 | 82.9 | 60.6 |
| 10 | Extruded wheat straw | 8.9 | 5 | 2.3 | 88.1 | 65.2 |
| 11 | Extruded wheat straw | 8.9 | 1 | 1.3 | 75.1 | — |

What is claimed is:

1. A method for treating lignocellulosic substrates which include lignin containing cell wall components that protect structural polysaccharides from digestion wherein the method improves the nutritive value of the substrate and consists essentially of the steps of:

chemically treating a plant substrate with a sufficient amount of an alkaline material and hydrogen peroxide or a compound which generates hydrogen peroxide, for a sufficient period of time to substantially disrupt the cell wall and substantially delignify non-woody lignocellulostic substrates to thereby obtain a blended mixture having a consistency of at least 20%; and simultaneously extruding the chemically treated plant substrate, wherein at least part of the chemical treatment occurs during extruding, wherein a product having increased nutrient ability is produced, wherein essentially all the polysaccharide up to about 80% is being made available for ruminal digestion and wherein the blended mixture has a consistency of at least 20%.

2. A method as defined in claim 1 wherein said lignocellulosic substrate is selected from the group consisting of cornstalks, corncobs, cornhusks, wheat straw, oat straw, rice straw, barley straw, rye straw, buckwheat straw, flak straw, grasses and mixtures thereof.

3. The method according to claim 1 wherein the alkaline material is an alkali metal hydroxide.

4. The method of claim 3 wherein the alkali metal hydroxide is sodium hydroxide or potassium hydroxide.

5. The method in accordance with claim 1, wherein the relative concentrations of hydrogen peroxide and alkaline material are determined from the formula %NaOH=3%+F×%H$_2$O$_2$, wherein F=greater than 0.5, preferably 1.2.

6. The method according to claim 1 wherein the alkaline material and the hydrogen peroxide are added as a reaction medium to the plant substrate.

7. The method of claim 1 wherein the extruding is done in an extruder apparatus with high grinding forces and chemical mixing efficiency.

* * * * *